(12) United States Patent
Scheepens et al.

(10) Patent No.: US 11,836,665 B2
(45) Date of Patent: Dec. 5, 2023

(54) EXPLAINABLE PROCESS PREDICTION

(71) Applicant: UiPath, Inc., New York, NY (US)

(72) Inventors: Roeland Johannus Scheepens, Eindhoven (NL); Celine Verhoef, Eindhoven (NL)

(73) Assignee: UiPath, Inc., New York, NY (US)

( * ) Notice: Subject to any disclaimer, the term of this patent is extended or adjusted under 35 U.S.C. 154(b) by 714 days.

(21) Appl. No.: 16/729,971

(22) Filed: Dec. 30, 2019

(65) Prior Publication Data

US 2021/0201184 A1    Jul. 1, 2021

(51) Int. Cl.
*G06Q 10/00* (2023.01)
*G06Q 10/0637* (2023.01)
*G06N 20/00* (2019.01)
*G06N 20/20* (2019.01)

(52) U.S. Cl.
CPC ....... *G06Q 10/06375* (2013.01); *G06N 20/00* (2019.01); *G06N 20/20* (2019.01)

(58) Field of Classification Search
None
See application file for complete search history.

(56) References Cited

U.S. PATENT DOCUMENTS

| | | | | |
|---|---|---|---|---|
| 7,680,752 | B1 * | 3/2010 | Clune, III | G06Q 10/06 706/45 |
| 8,140,454 | B2 * | 3/2012 | Bullen | G06Q 10/06 706/14 |
| 8,589,207 | B1 * | 11/2013 | Macosky | G06Q 10/0633 705/7.38 |
| 9,372,736 | B2 * | 6/2016 | Curbera | G06Q 10/04 |

(Continued)

FOREIGN PATENT DOCUMENTS

| | | |
|---|---|---|
| CN | 109657977 A | 4/2019 |
| JP | H07253963 A | 10/1995 |

OTHER PUBLICATIONS

Hernandez, Juan, Making AI Interpretable with Generative Adversarial Networks, Apr. 4, 2018, Squareup, https://developer.squareup.com/blog/making-ai-interpretable-with-generative-adversarial-networks/, p. 1-18. (Year: 2018).*

(Continued)

*Primary Examiner* — Joseph M Waesco
(74) *Attorney, Agent, or Firm* — CHIESA SHAHINIAN & GIANTOMASI PC

(57) ABSTRACT

A method and system are provided in which predictions are generated, using one or more machine learning-based prediction models, for one or more process parameters associated with a running process. Explanation-oriented data elements are generated that correspond to the generated predictions and include confidence indicators associated with the generated predictions. The explanation-oriented data elements are presented in one or more dashboards of a visualization platform. The explanation-oriented data elements are representative of an explanation framework for explaining the predicted business process parameters generated by a machine learning-based prediction model and in a manner so that a user can understand and trust the basis for the predictions to facilitate effective and appropriate intervention in a running process.

22 Claims, 13 Drawing Sheets

(56) References Cited

U.S. PATENT DOCUMENTS

| | | | | |
|---|---|---|---|---|
| 2010/0138368 | A1* | 6/2010 | Stundner | G06N 20/00 706/47 |
| 2014/0236654 | A1* | 8/2014 | Cantor | G06Q 10/06312 705/7.15 |
| 2015/0269495 | A1* | 9/2015 | Dalessandro | G06N 20/00 706/12 |
| 2017/0235848 | A1* | 8/2017 | Van Dusen | G06F 16/904 705/12 |
| 2018/0032915 | A1* | 2/2018 | Nagaraju | G06V 10/95 |
| 2018/0247207 | A1* | 8/2018 | Ristovski | G07C 5/02 |
| 2019/0080253 | A1* | 3/2019 | Lokare | G06N 3/08 |
| 2019/0122135 | A1* | 4/2019 | Parker | G06N 5/01 |
| 2019/0199736 | A1* | 6/2019 | Howard | H04L 63/1425 |
| 2019/0220824 | A1* | 7/2019 | Liu | G06Q 10/1053 |
| 2019/0392255 | A1* | 12/2019 | Franklin | G06Q 10/00 |
| 2020/0125635 | A1* | 4/2020 | Nuolf | G06N 20/20 |
| 2020/0134103 | A1* | 4/2020 | Mankovskii | G06F 40/56 |
| 2020/0134489 | A1* | 4/2020 | Achin | G06Q 10/06 |
| 2020/0219004 | A1* | 7/2020 | Daly | G06N 20/00 |
| 2020/0327371 | A1* | 10/2020 | Sharma | H04L 67/34 |
| 2021/0073915 | A1* | 3/2021 | Crabtree | G06Q 30/0611 |
| 2021/0125106 | A1* | 4/2021 | Okamoto | G06N 7/01 |
| 2021/0158227 | A1* | 5/2021 | Budzik | G06N 5/01 |

OTHER PUBLICATIONS

Lundberg et al., "A Unified Approach to Interpreting Model Predictions," 31st Conference on Neural Information Processing Systems (NIPS 2017), Advances in Neural Information Processing Systems 30, Curran Associates Inc., 2017, pp. 4765-4774.

Leontjeva et al., "Complex Symbolic Sequence Encodings for Predictive Monitoring of Business Processes," Lecture Notes in Computer Science (LNCS, vol. 9253), 2015, pp. 297-313.

Lundberg et al., "Consistent Individualized Feature Attribution for Tree Ensembles," retrieved from https://arxiv.org/abs/1802.03888, submitted on Feb. 12, 2018 (v1), last revised Mar. 7, 2019 (current version, v3), 9 pgs.

Angiulli et al., "Distance-Based Detection and Prediction of Outliers," IEEE Transactions on Knowledge and Data Engineering, vol. 18, No. 2, Feb. 2006, pp. 145-160.

Koenker et al., "Quantile Regression," Journal of Economic Perspectives, vol. 15, No. 4, 2001, pp. 143-156.

Du et al., "Techniques for Interpretable Machine Learning," retrieved from http://arxiv.org/abs/1808.00033, submitted on Jul. 31, 2018 (v1), last revised May 19, 2019 (current version, v3), 9 pgs.

Teinemaa et al., "Outcome-Oriented Predictive Process Monitoring: Review and Benchmark," retrieved from https://arxiv.org/pdf/1707.06766.pdf, submitted on Jul. 21, 2017 (v1), last revised Oct. 23, 2018 (cirrent version, v4), 59 pgs.

Ribeiro et al., "Model-Agnostic Interpretability of Machine Learning," ICML Workshop on Human Interpretability in Machine Learning, retrieved from https://arxiv.org/abs/1606.05386, Jun. 16, 2016, pp. 91-95.

Ribeiro et al., "Why Should I Trust You? Explaining the Predictions of Any Classifier," Proceedings of the 22Nd ACM SIGKDD International Conference on Knowledge Discovery and Data Mining, Aug. 9, 2016, pp. 1135-1144.

Letham et al., Interpretable Classifiers Using Rules and Bayesian Analysis: Building a Better Stroke Prediction Model, The Annals of Applied Statistics (2015), vol. 9, No. 3, pp. 1350-1371.

International Search Report and Written Opinion dated Dec. 8, 2020, in connection with International Patent Application No. PCT/US2020/049302, filed Sep. 4, 2020, 10 pgs.

* cited by examiner

FIG. 6

Invoices

- Overview
- Cases
- Process
- Timing
- Users
- Details
- Predictions

Overview Contributions Training data

← Prediction

| Case ID | Current activity | Remaning time | On average | Case attributes | Activities | Event attributes |
|---|---|---|---|---|---|---|
| 109 | Request data | 12d | 12d | -1h | -3m | 4h |

What contributed to the prediction?

Case attributes | Activities | Event attributes

| Attribute | Value | contribution | | | | | Total |
|---|---|---|---|---|---|---|---|
| Case type | High-level invoice | | | | | 23h | 1d |
| | Small invoice | 2h | | | | | |
| | Preferred supplier | 2h | | | | | |
| | Medium invoice | -7m | | | | | |
| | Partner | | 5m | | | | |
| | Employee declaration | | 0s | | | | |
| Case owner | Gary Le | -13h | | | | | -20h |
| | Cruz Abbott | -13h | | | | | |
| | Clio Butler | | | 12h | | | |
| | Macy Hurst | -9h | | | | | |
| | Fiona Luna | | | 8h | | | |
| | Knox Gonzalez | -6h | | | | | |
| | Tanner Wiggins | 54m | | | | | |

| Attribute | Value | Contribution | Total |
|---|---|---|---|
| Case type | High-level invoice | 23h | 1d |
| | Small invoice | 2h | |
| | Preferred supplier | 2h | |
| | Medium invoice | -7m | |
| | Partner | 5m | |
| | Employee declaration | 0s | |

FIG. 7B

| Activity | Occurrences | Contribution |
|---|---|---|
| Repeat payment process | 0 | -3m |
| Check contract conditions | 0 | -50s |
| Check received invoice | 1 | 3s |
| Receive invoice | 1 | 0s |
| Final check of invoice | 0 | 0s |
| Approve invoice | 0 | 0s |
| Pay invoice | 0 | 0s |
| Checked and approved | 0 | 0s |
| Pay employee reimbursement | 0 | 0s |
| Request data | 1 | 0s |
| Creditor does not exist | 0 | 0s |
| Clarify deviant invoice | 0 | 0s |
| Post-process invoice | 0 | 0s |
| Process employee reimbursement | 0 | 0s |
| Total | | -3m |

FIG. 7C

| Attribute | Value | Occurrences | Contribution | Total |
|---|---|---|---|---|
| Country | US | 0 | 3h | 4h |
| | Germany | 3 | 1h | |
| | UK | 0 | -24m | |
| | Netherlands | 0 | 1m | |
| | France | 0 | 0s | |
| | Switzerland | 0 | 0s | |
| | Austria | 0 | 0s | |

EXPLAINABLE PROCESS PREDICTION

TECHNICAL FIELD

The present disclosure relates generally to process mining, and more particularly to an explanation framework for understanding predicted business process parameters in a running process.

BACKGROUND

Businesses store a large amount of data about their process executions to monitor and improve their processes. Process mining techniques are used to derive insights from this stored data for various purposes such as discovering the process model, checking for conformance, improving the process model, and predicting behavior in open cases (e.g., a running process).

Traditional process mining techniques use historical data to provide insight into the current behavior of a process. A predictive component can be integrated into process mining to facilitate intervention, e.g., by a user, during ongoing process executions. Typically, a predictive component requires the use of machine learning models to make predictions. Although complex machine learning models can be used to improve the accuracy of predictions, the decision logic of these models is difficult to understand. Generally, explanations can be provided on how the model works (e.g., global) and/or how a specific prediction is obtained (e.g., local). Understanding the decision logic of a model and, in particular, understanding how a specific prediction is obtained, is an important consideration for a user who must be able to trust the prediction before intervening in a process.

Current approaches to explainable machine learning are directed to general applications of machine learning and are not effective in the domain of process predictions. For example, some current approaches provide a specific technique for explaining the decision logic of the model, but fall short of providing the requisite explanations for a user to be able to trust the predictions generated by the model such that actionable decisions and interventions can be executed during a running process.

SUMMARY

These and other issues are addressed, in accordance with the various embodiments, by providing an explanation framework for explaining predicted business process parameters generated by a machine learning-based prediction model (e.g., providing an explanation of how a specific prediction is obtained) and in a manner so that a user can understand and trust the basis for the prediction to facilitate effective and appropriate intervention in a running process.

In an embodiment, a computer-implemented method is provided that generates predictions, using one or more machine learning-based prediction models, for one or more process parameters associated with a running process. Explanation-oriented data elements are generated that correspond to the generated predictions, the explanation-oriented data elements including confidence indicators associated with the generated predictions. The explanation-oriented data elements are presented in one or more dashboards of a visualization platform.

Other embodiments include a system and a computer program embodied on a non-transitory computer-readable medium in accordance with the computer-implemented method described above.

According to one or more embodiments, a process parameter may be a remaining process time parameter, e.g., indicating the remaining time for the running process. According to various embodiments, the explanation-oriented data elements are representative of an explanation framework for the generated predictions, with the explanation framework being model-agnostic relative to the machine learning-based prediction models that may be used for predictions. In one or more embodiments, generating predictions involves training the machine learning-based prediction models in an off-line mode using a respective training set including closed cases and selecting a particular trained model to generate predictions in an on-line mode for the running process. Training the machine learning-based prediction models may include extracting prefix traces from an event log of a closed case, associating the extracted prefix traces to buckets based on a last known activity in each of the extracted prefix traces, and encoding the extracted prefix traces in feature vectors associated with each of the buckets to generate a respective trained model for each of the buckets. According to various embodiments, generating the explanation-oriented data elements includes generating a feature contribution data element that indicates how a feature contributed to a predicted value. In some examples, comparative attributes from similar cases in a neighborhood are identified and applied. For example, a predicted process parameter of the running process may be compared with the similar cases in the neighborhood to derive a confidence indicator for the predicted process parameter in the running process. In various embodiments, the dashboards in the visualization platform may include an overview dashboard (e.g., to show remaining time predictions for activities in an open case), a contributions dashboard (e.g., showing feature contributions) and a training data dashboard (e.g., to facilitate inspection of the training data).

These and other advantages will be apparent to those of ordinary skill in the art by reference to the following detailed description and the accompanying drawings.

BRIEF DESCRIPTION OF THE DRAWINGS

FIG. 6 is a screenshot illustrating features of a dashboard from a visualization platform according to one or more embodiments;

FIGS. 7A through 7C show various examples of feature contributions (e.g., where the features are based on attributes) for presentation in dashboard views according to one or more embodiments;

DETAILED DESCRIPTION

The various embodiments described herein are applicable to any type of process or workflow, which may be implemented in various ways including, for example, processes implemented with robotic process automation (RPA). As such, the examples described herein are meant to be illustrative and not limiting in any manner.

Figure 1:
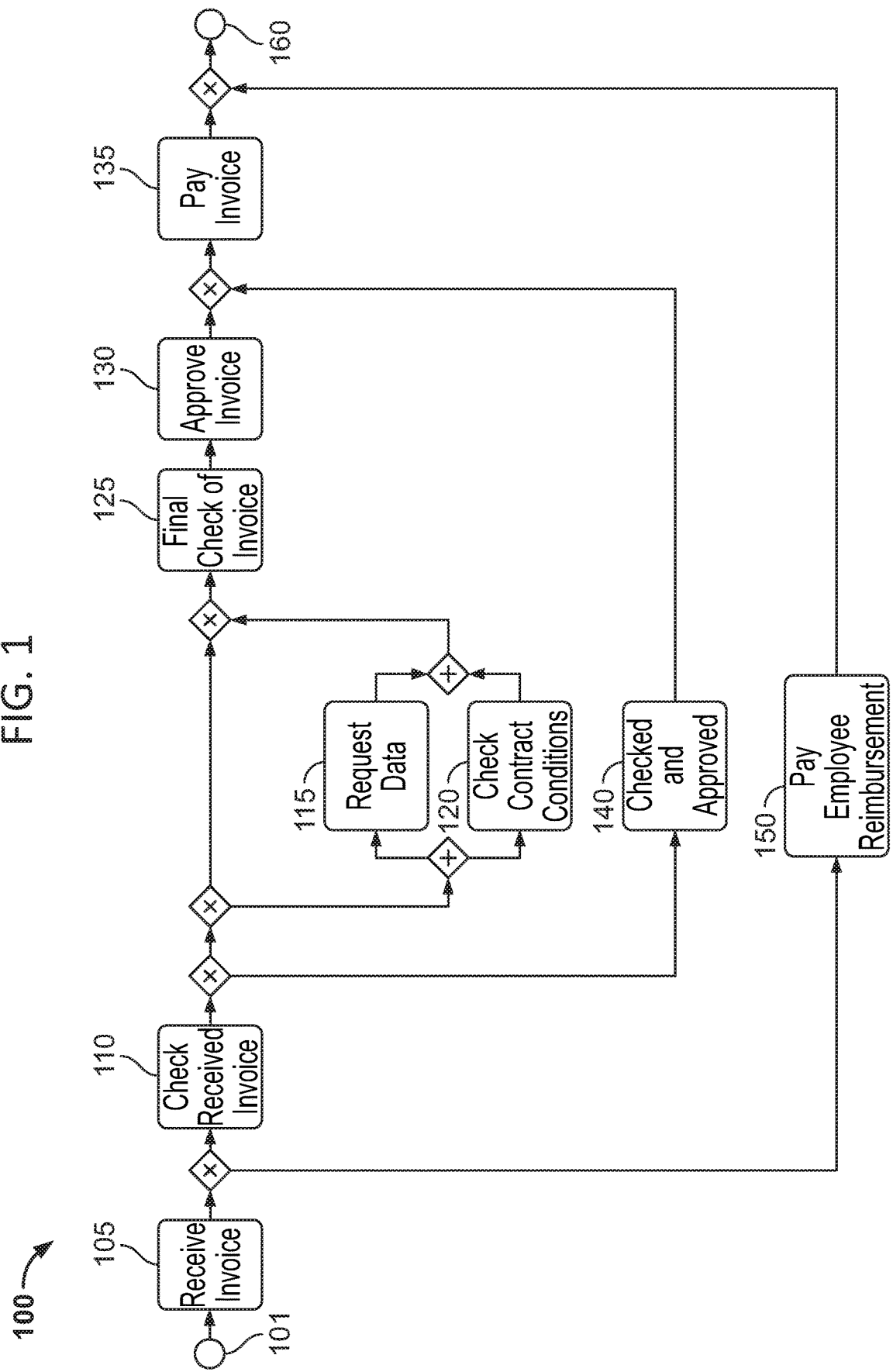
FIG. 1 shows an exemplary business process for use with the various embodiments.

FIG. 1 shows an example of a business process associated with payment of invoices, in which the various embodiments can be advantageously applied. Process 100, which is initiated at start point 101 and concludes at end point 160, includes various activities and paths that may be executed serially or in parallel. Some activities may be conditionally implemented depending on the nature of the invoice being processed, particular process controls that may be in effect, and so on. For sake of brevity, only a general description is provided to illustrate the multiple activities that may be associated with a typical business process.

As shown, process 100 includes the following activities: receiving an invoice (activity 105); checking the received invoice (activity 110); requesting data (activity 115); checking contract conditions (activity 120); performing a final check of the invoice (activity 125); approving the invoice (activity 130); paying the invoice (activity 135); checking and approving the invoice when no further data is requested or when contract conditions are not checked (activity 140); and paying employee reimbursement (activity 150). Data associated with execution of process 100 would typically be stored in an event log, which may be a set of events that represent the execution of the various activities in process 100. The time remaining for completion of an open case (e.g., while process 100 is running) is an example of a process parameter that would be useful to monitor and predict so that a user (e.g., business analyst) could intervene, if necessary. For example, if the prediction of remaining time to complete an open case extends past a deadline, a user can decide to take action and intervene in the process execution. However, to do so in the most effective and least disruptive manner, a user would have to be able to trust the prediction.

Figure 2:
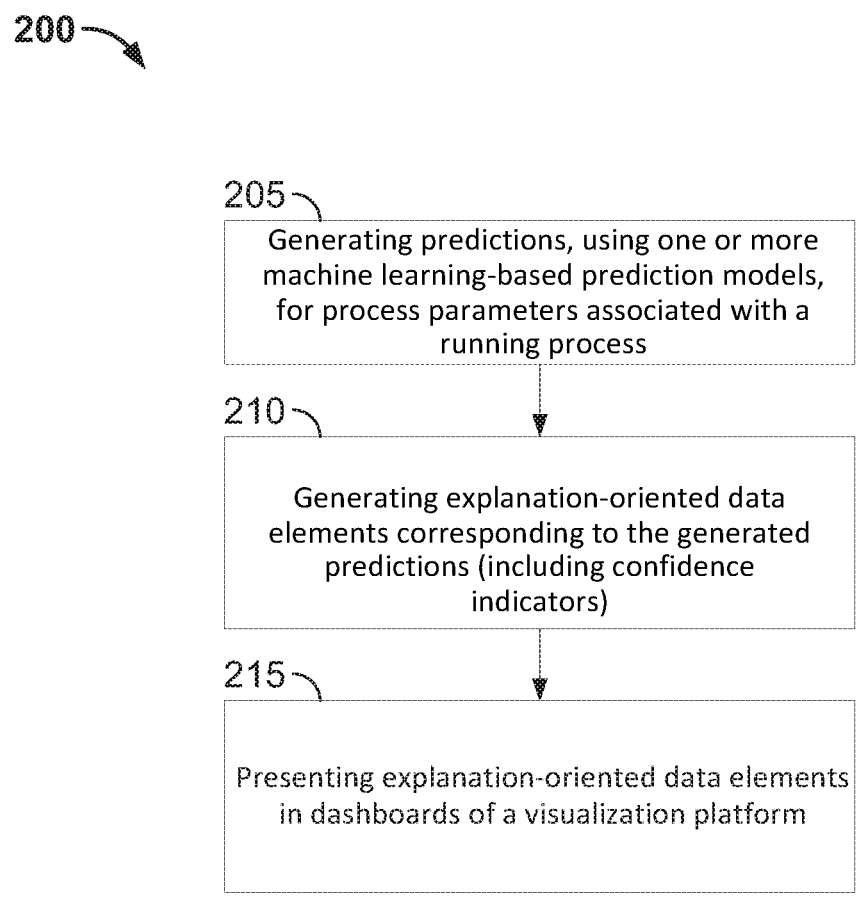
FIG. 2 shows a flowchart of a method according to one or more embodiments.

According to the various embodiments described herein, an explanation framework is described for explaining predictions generated by a machine learning-based model, such that a user can understand and trust the basis for the predictions to facilitate effective and appropriate intervention in a running process. FIG. 2 shows a high level flow chart illustrating a method 200 according to various embodiments. In step 205, one or more machine learning-based prediction models are used for generating predictions for one or more process parameters associated with a running process. As described, one such process parameter is remaining process time, which indicates the remaining time for the running process e.g., remaining process time in each activity and so on.

In step 210, explanation-oriented data elements are generated, which correspond to the generated predictions. The explanation-oriented data elements may include confidence indicators (e.g., low or high degree of trust, etc.) associated with the generated predictions. The explanation-oriented data elements are representative of an explanation framework for the generated predictions. As will be described in further detail below, the explanation framework may be model-agnostic, which may be beneficial when more than one machine learning-based prediction model is selected for making predictions.

In step 215, the explanation-oriented data elements are presented in one or more dashboards of a visualization platform. Visualization of the explanation framework helps a user to effectively (and in a timely manner) identify a case that may require intervention.

Figure 3:
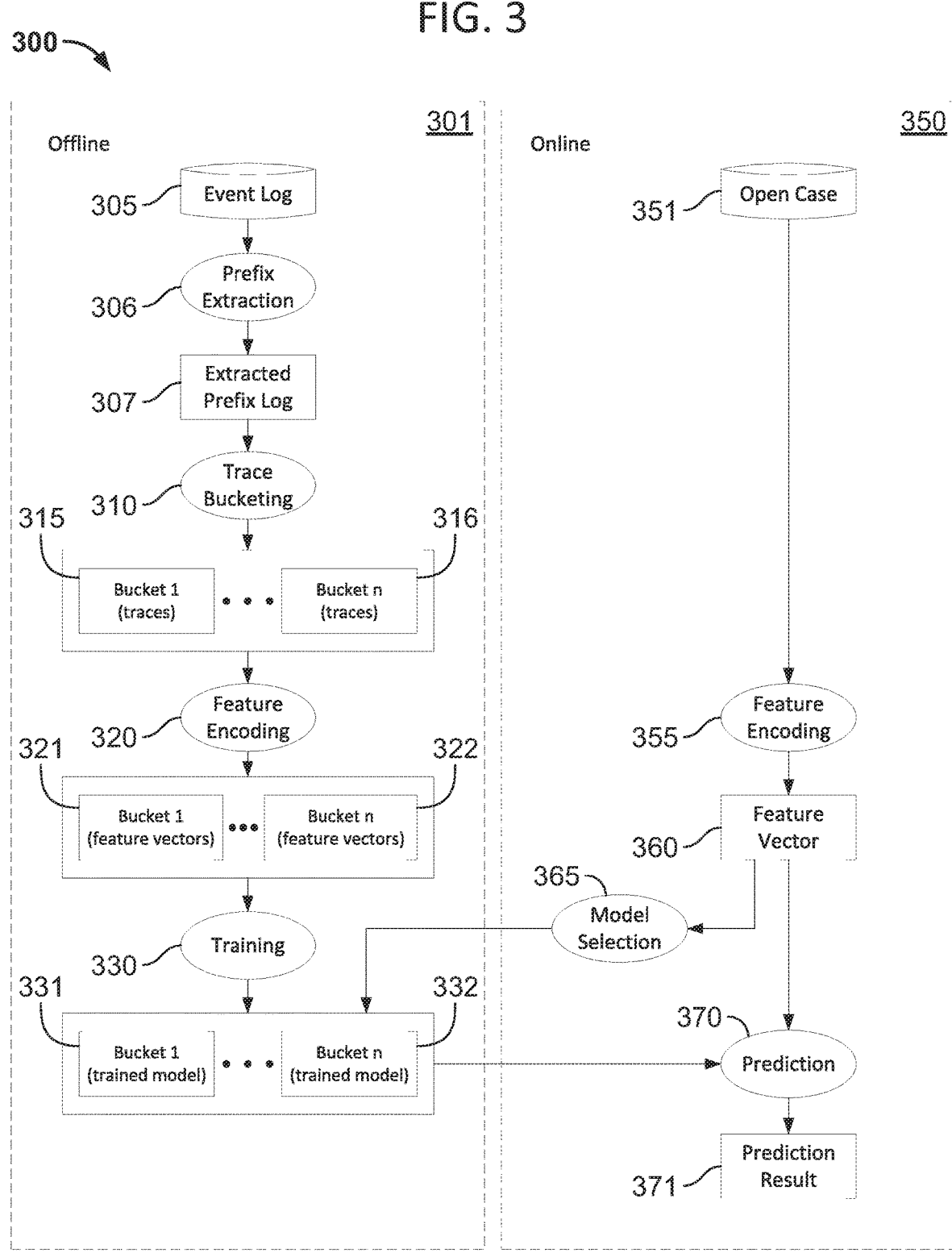
FIG. 3 shows a flowchart of a method for predicting process parameters according to one or more embodiments.

FIG. 3 shows a flow chart illustrating a method 300 for predicting a process parameter (e.g., remaining process time) according to one or more embodiments. As shown in block 301, one or more machine learning-based prediction models are trained in an off-line mode (phase) using a respective training set including closed cases and, in block 350, a particular trained model is selected for generating predictions in an on-line mode (phase) for the running process (e.g., open case).

In step 306, prefix traces are extracted from event log 305 and stored in extracted prefix log 307. In step 310, a bucketing approach is applied that assigns the prefix traces to a bucket based on the last known activity in the prefix trace, e.g., shown as block 315 for the traces corresponding to bucket 1 through block 316 for the traces corresponding to bucket n. The prefix traces are then encoded in feature vectors in step 320 for each corresponding bucket, e.g., shown as block 321 for the encoded feature vectors corresponding to bucket 1 through block 322 for the encoded feature vectors corresponding to bucket n. In step 330, the encoded feature vectors are used as input for training the machine learning-based prediction models corresponding to each bucket, e.g., shown as block 331 for the trained model corresponding to bucket 1 through block 332 for the trained model corresponding to bucket n.

In the online mode (block 350), a prefix trace from an open case 351 is encoded in step 355 to generate a feature vector at step 360. The machine learning-based model is selected in step 365 from among the stored trained models (e.g., in block 331, 332, etc.) and then used for making the prediction (e.g., of remaining process time) in step 370 for the open case, thereby generating a prediction result in step 371. In one example, selecting the particular trained model includes identifying the respective trained model based on a partial prefix trace encoded in a feature vector associated with the open case (running process).

Various machine learning-based models may be suitable for making predictions according to the described embodiments. In one non-limiting example, a gradient boosting model based on a regression algorithm may be used due to its speed and usefulness in practical applications. For example, high-quality predictions can be obtained with so-called ensemble methods, which use multiple machine learning models to obtain a better prediction quality than could be obtained from a single model. In the case of a gradient boosting model, new models can be added to the ensemble sequentially. Various implementation details for a gradient boosting model are known and will not be described in detail herein. However, with regard to handling the complexity of a prediction model, the following discussion will aid in understanding the application of such machine learning-based models in the context of the described embodiments.

In particular, various design considerations can be taken into account for applying the machine learning-based model for carrying out predictions in the disclosed embodiments, e.g., to reduce training time, prediction time, etc. For example, assume N is the size of the training data, T is the number of iterations, and d is the dimension of the aforementioned feature vectors. In one embodiment, the resultant running time for training a gradient boosting model can be represented as $O(TdN)$ time and the running time for making a prediction in an open case can be represented in $O(T)$ time. Therefore, design choices can then be made to decrease the training time, for example, by decreasing the size N of the training data and the dimensionality d of the feature vector.

With regard to prefix extraction (e.g., step 306 in FIG. 3), the size N of the training data can be limited by selecting a maximum of I prefixes of a complete trace with random gap sizes g. This option also removes a possible bias towards cases that may have executed many activities. The size N of the training data can also be limited by only taking into account the traces that have a process execution according to the current process model.

With regard to trace bucketing (in step 310), the prefix traces can be divided into buckets based on the last known activity to generate a more intuitive set of similar cases, which will be described in further detail below. This option also has a positive effect on the training time. Adapting the state bucketing approach, in which only the last activity is considered can also be advantageous because of the intuitive base value per bucket and the guarantee that always-trained models are available for selection for prediction in open cases.

With regard to feature encoding, how prefix traces are encoded in feature vectors can also influence the explanations that are provided for the predictions, as will be described in further detail below. Therefore, as another option, aggregated encoding in combination with one-hot encoding can be used, which allows for accurate predictions and features that can be well interpreted.

With regard to attribute selection, attributes can be selected to limit the number of features that are encoded, thereby decreasing the training time and reducing the complexity in explanations of the predictions (e.g., less complicated explanations). In one example, attributes can be selected based on the number of categories of an attribute and differences in remaining time distribution between the categories. The various design considerations described above are intended to be illustrative and not limiting in any manner.

According to the various embodiments described herein, an explanation framework is provided for the predictions generated by the machine learning-based models, e.g., explanation(s) of the remaining process time predictions to provide a user with a better understanding and confidence (trust) level in the generated predictions. The explanation framework can then be presented to the user through a visualization platform, e.g., providing the user with explanation-oriented data elements that correspond to the generated predictions. Because there may be more than a single machine learning-based model used for making predictions, the explanation framework is model-agnostic in one or more embodiments.

In developing the explanation framework, various techniques may be employed and/or combined based on which goals are to be achieved and/or methods that can be practically implemented. According to one or more embodiments, an explanation framework can be based on components (methodologies) such as feature contribution (e.g., how a feature contributed to a predicted value) and/or similar cases (e.g., identifying and applying comparative attributes from similar cases in a neighborhood).

The following table summarizes the goals and methods for each of these components:

| Component | Goal | Method |
| --- | --- | --- |
| Feature contributions | Understand what leads to the prediction | SHAP values |
| Similar cases | Understand the predicted value | Prediction interval<br>Distribution of remaining times |
| | Assess the trustworthiness of the prediction | Visualization of the training data<br>Outlier prediction |
| | Understand the process influence on the prediction | Predictions at next steps in the process |

Feature contributions can form part of the explanation framework to provide the user with an understanding of what leads to the prediction. Determining feature contribution involves computing and interpreting values based on one or more types of attributes encoded in the feature vector associated with the running process. For example, the feature contribution to the predicted parameter value may be computed in the form of SHAP (Shapley Additive Explanations) values. The prefix traces in the event log are encoded in feature vectors such that they can be used as input for the prediction model. Several types of attributes in a prefix trace can be encoded in the feature vector, e.g., control-flow attributes, case attributes, and event attributes. The encoding of the attributes in feature vectors has a direct effect on how the SHAP values of the features are interpreted.

Explanation by similar cases can also form part of the explanation framework to provide the user with an understanding of predicted values, assessing the trustworthiness of the predictions (e.g., a confidence indicator), and understanding the process influence on the prediction. In one example, a set of similar cases can be based on: (1) SHAP values (e.g., similarity between cases based on a similar contribution to the prediction); and/or (2) feature vector (e.g., similarity between cases is based on similar control-flow and data attributes).

With regard to understanding the predicted values, a user can compare the predicted remaining process time of an open case to the remaining process time of cases in its neighborhood based on the assumption that similar cases have a similar remaining process time. To give the user insight into the certainty of the predicted values, a prediction interval may be computed.

To understanding the process influence on a prediction, the average prediction value at next steps in the process execution of cases in the neighborhood (of the open case) can be computed. The computed average prediction value(s) allow the user to identify which activities are expected to be executed, identify activities at which the predicted values change, and identify activities at which the prediction certainty changes.

The explanation framework (via explanation-oriented data elements) are presented in one or more dashboards of a visualization platform. In one embodiment, the information is visualized in an application that runs on the platform and may include several dashboards, each of which may present specific aspects of a data set. For the visualization of the explanation framework, dashboards can be integrated in a template application for process data.

Figure 4:
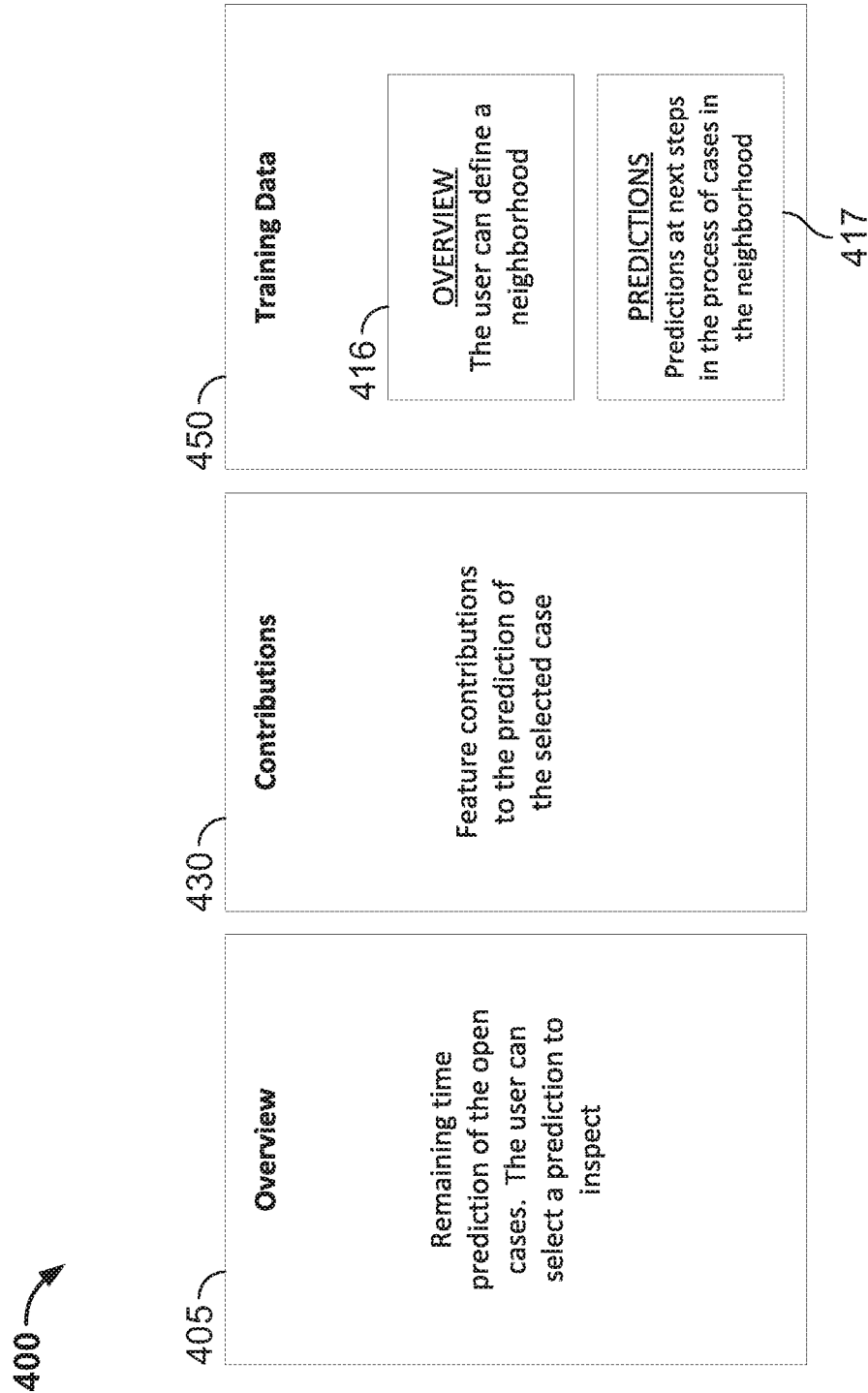
FIG. 4 is a block diagram of an illustrative dashboard configuration according to one or more embodiments.

In one or more embodiments, the components of the explanation framework are visualized in three dashboards, each of which may include one or more dashboard items. FIG. 4 shows a simplified view of a template 400 that includes an overview dashboard 405, a contributions dashboard 430 and a training data dashboard 450. Overview dashboard 405 may be configured to show a view of the remaining time predictions in a selected open case so that a user may select a prediction to inspect. Contributions dashboard 430 may be configured to show a view of the feature contributions to the predictions of the selected case. Training data dashboard 450 may be configured to show a view of various information relating to the training data. In one example, training data dashboard may include view 416 that allows a user to select/define a neighborhood and inspect the training data in that neighborhood. Training data dashboard may also include view 417 that provides a view of the predictions at next steps in the process from cases in the same neighborhood (of the open case).

Figure 5:
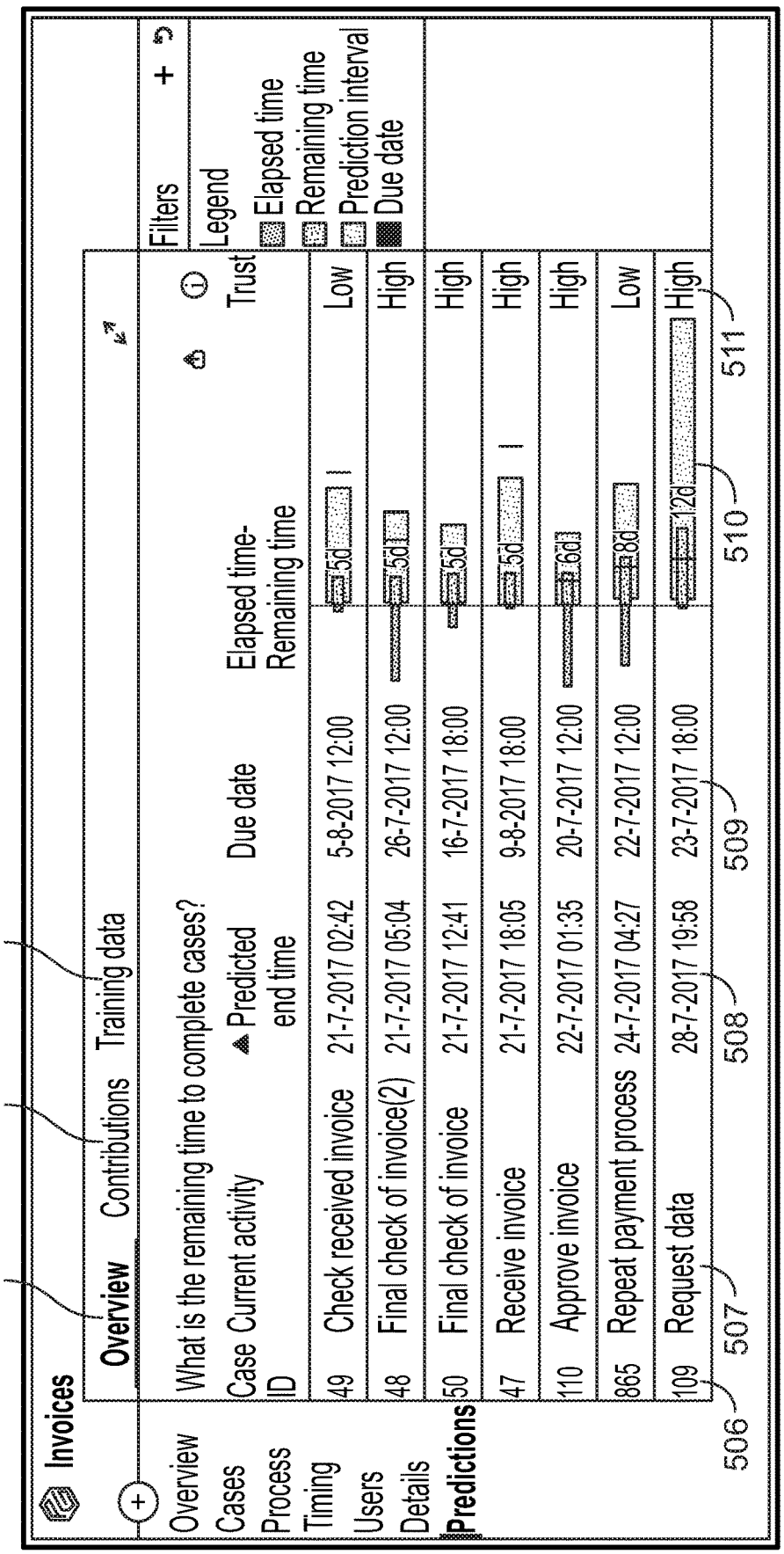
FIG. 5 is a screenshot illustrating features of a dashboard from a visualization platform according to one or more embodiments.

FIG. 5 shows a screenshot of an integrated dashboard 500 with tabs for overview dashboard 505, contributions dashboard 530 and training data dashboard 550. The overview dashboard 505 is configured to show an overview of the predictions generated by the machine learning-based model (s) for the open cases in the data set. In this example, the view includes, for each case: case ID 506; the current activity 507; the predicted end time 508; the due date 509; bar charts 510 showing the elapsed time, predicted remaining time with prediction interval; and the trustworthiness of the prediction (e.g., low, high). This presentation view, and the elements included therein, are only meant to be illustrative and not limiting in any manner.

FIG. 6 shows a screenshot of an integrated dashboard 600 with tabs for overview dashboard 605, contributions dashboard 630 and training data dashboard 650. The contributions dashboard 630 is configured to show data related to feature contributions to the predicted value. In this non-limiting example, contributions dashboard 630 includes dashboard item 631, which shows the prediction of the selected cases and a summary of the feature contributions. Contributions dashboard 630 is configured in this example to have three tabs (section 632), for selection by the user, corresponding to case attributes (e.g., attributes that have a single value per case), activities, and event attributes (e.g., attributes that can have different values for different events, i.e., the value can change over the course of the case execution). Each tab shows a view (section 633) of feature contributions per attribute type.

FIGS. 7A, 7B and 7C show views of the three attribute types, which are sub-sections of feature contributions. FIG. 7A shows case attributes 705, which in this example includes case type 706 (e.g., "high level invoice", "small invoice", etc.) and contribution 707 (e.g., time contribution). For case attributes 705, this exemplary view shows attribute values "greyed out", which do not correspond to the attribute value of the selected case. FIG. 7B shows activities 710, which in this example includes the activity type 711, occurrences 712, and contribution 713. This exemplary view shows a running view (e.g., the process as it is running). FIG. 7C shows event attributes 715, which in this example includes the country 716, occurrences 717, and contribution 718. Similar to FIG. 7B, this exemplary view shows a running view (e.g., the process as it is running).

Figure 8:
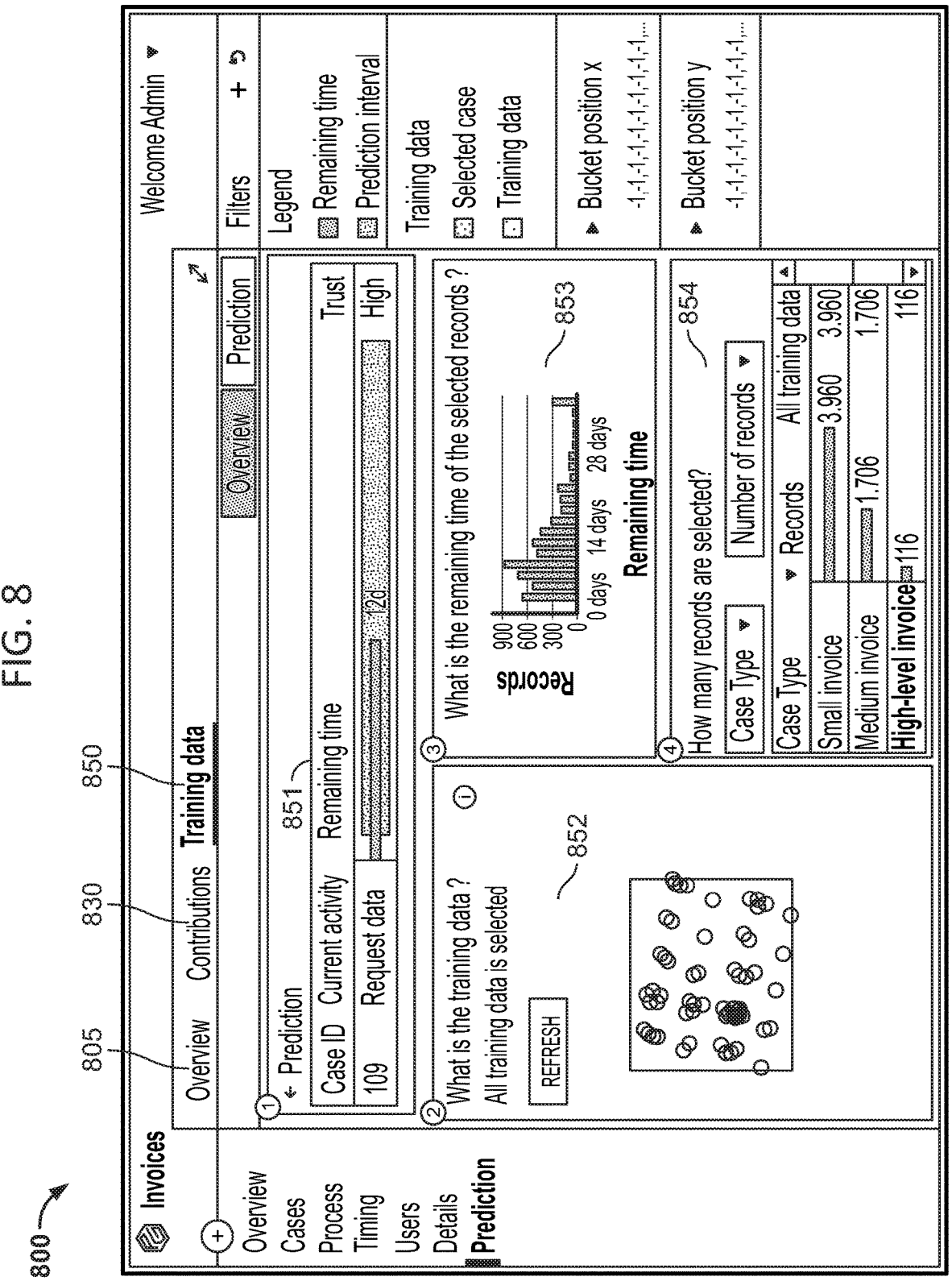
FIGS. 8 through 10 show various screenshots illustrating features of a training data dashboard from a visualization platform according to one or more embodiments.

FIG. 8 shows a screenshot of an integrated dashboard 800 with tabs for overview dashboard 805, contributions dashboard 830 and training data dashboard 850. The training data dashboard 850 is configured to show an overview of the training data. In this non-limiting example, training data dashboard 850 includes dashboard item 851 that shows a view of the prediction of the selected case and its trustworthiness (e.g., "high"). Dashboard item 852 is configured to show a two-dimensional (2D) visualization of the training data. Dashboard item 853 shows the distribution of remaining times of the selected training data and dashboard item 854 shows information about the selected training data, e.g., how many records are selected, etc. As in the preceding screenshots, this presentation view, and the elements included therein, are only meant to be illustrative and not limiting in any manner.

Figure 9:
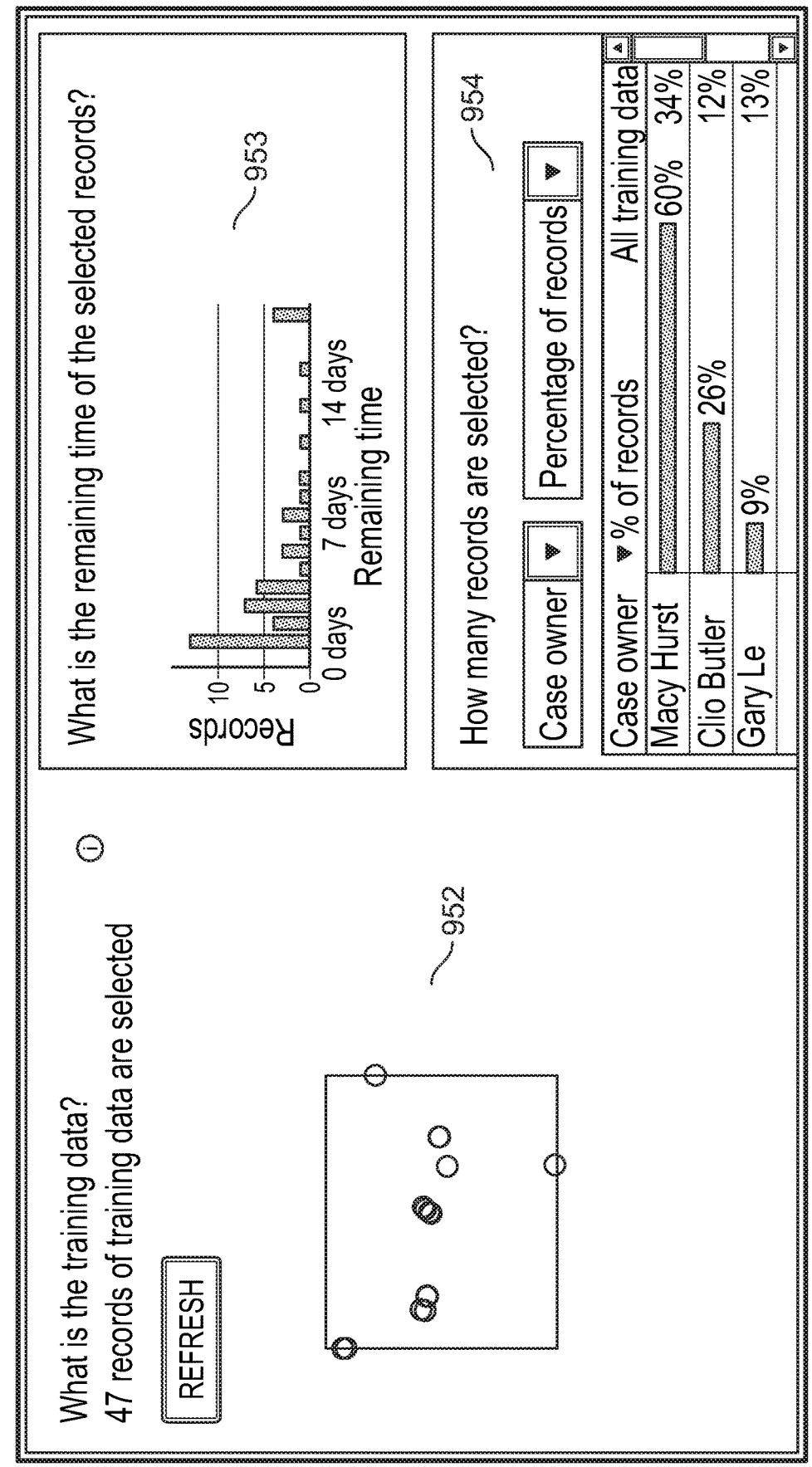

FIG. 9 is a presentation view 900 that shows a selection of 47 records of training data and associated information regarding distribution of remaining times and a description of cases in the selected training data. In this example, dashboard item 952 shows a 2D visualization of the training data, dashboard item 953 shows the remaining time of the selected records, and dashboard item 954 shows additional information about the selected training data (e.g., percentage of records selected by case owner, etc.).

Figure 10:
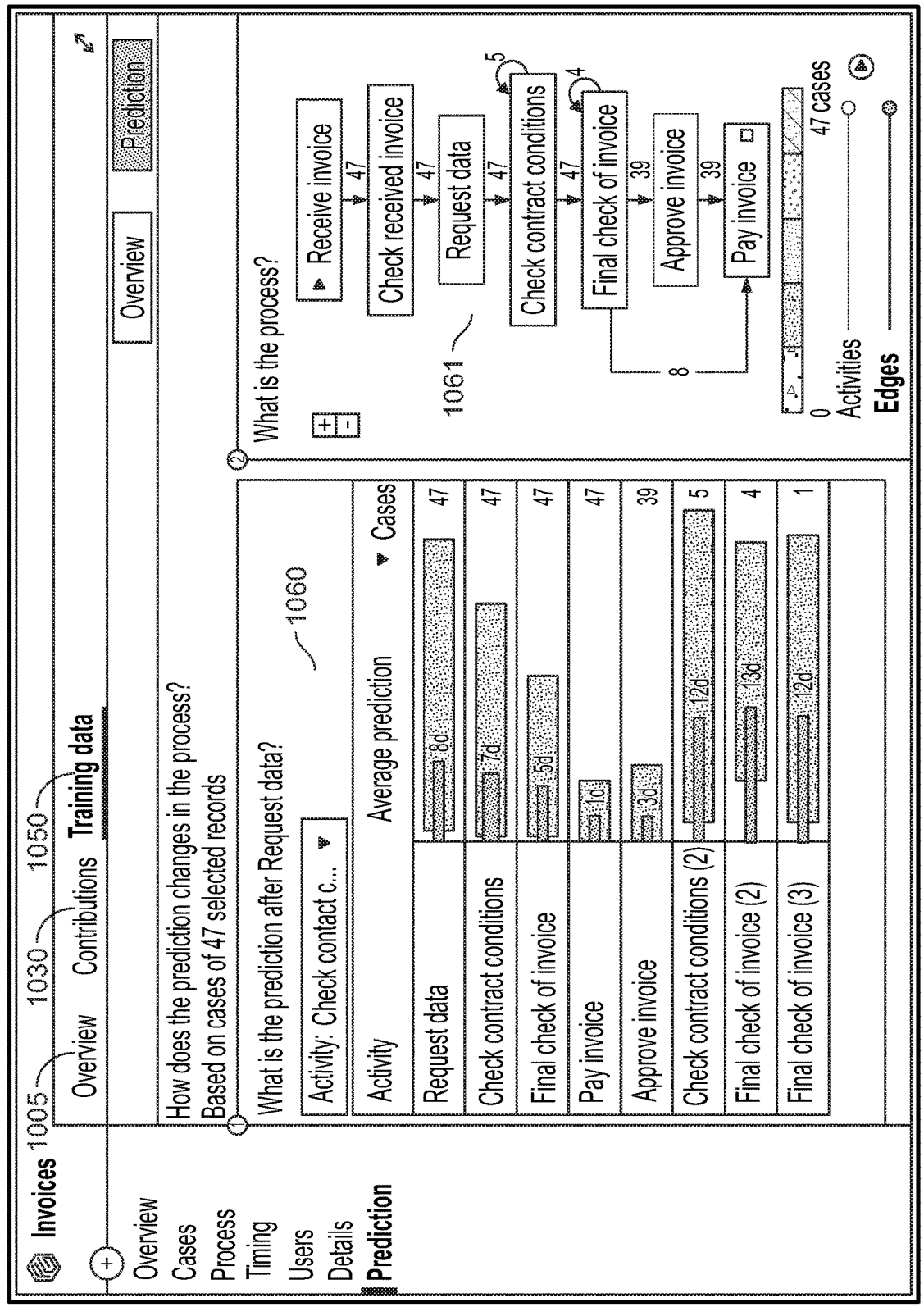

FIG. 10 shows a screenshot of an integrated dashboard 1000 with tabs for overview dashboard 1005, contributions dashboard 1030 and training data dashboard 1050. The training data dashboard 1050 is displayed in FIG. 10 and is configured to show the predictions at next steps in the process of cases in the neighborhood. In this example, dashboard item 1060 shows the average prediction of cases that execute the activities and dashboard item 1061 shows a graphical representation of the process model. Again, as in all the preceding screenshots, this presentation view in FIG. 10, and the elements included therein, are only meant to be illustrative and not limiting in any manner.

Figure 11:
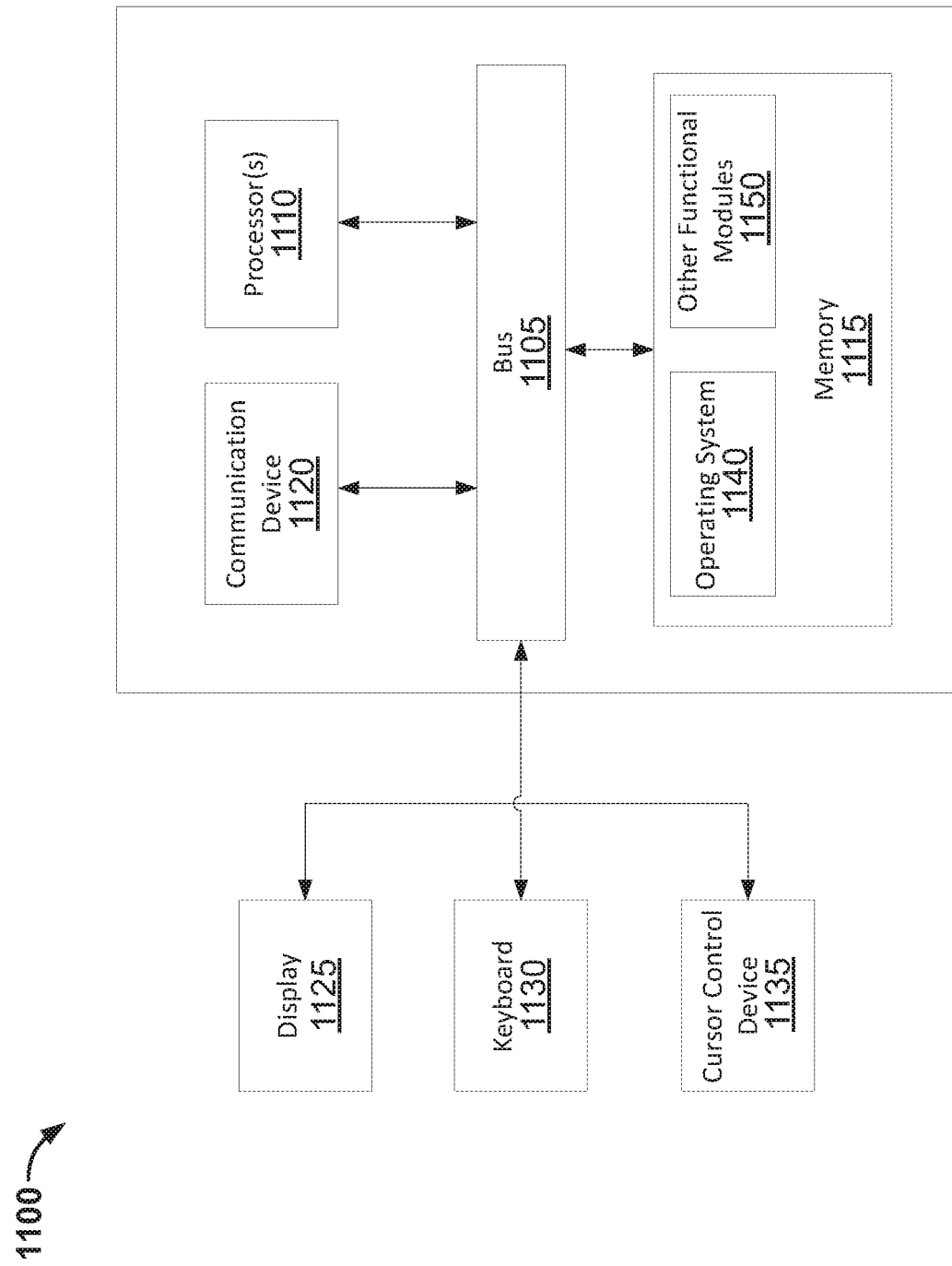
FIG. 11 shows a high-level block diagram of a computing system according to one or more embodiments.

FIG. 11 is a block diagram illustrating a computing system 1100 configured to execute the methods described herein, according to an embodiment. In some embodiments, computing system 1100 may be one or more of the computing systems depicted and/or described herein. Computing system 1100 includes a bus 1105 or other communication mechanism for communicating information, and processor (s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments.

Computing system 1100 further includes a memory 1115 for storing information and instructions to be executed by processor(s) 1110. Memory 1115 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection according to any currently existing or future-implemented communications standard and/or protocol.

Processor(s) 1110 are further coupled via bus 1105 to a display 1125 that is suitable for displaying information to a user. Display 1125 may also be configured as a touch display and/or any suitable haptic I/O device.

A keyboard 1130 and a cursor control device 1135, such as a computer mouse, a touchpad, etc., are further coupled to bus 1105 to enable a user to interface with computing system. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100 and one or more additional functional modules 1150 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
generating predictions, using a particular machine learning-based prediction model, for one or more process parameters associated with a running process by selecting the particular machine learning-based prediction model from among one or more trained machine learning-based prediction models for generating the predictions in an on-line mode for the running process, the particular machine learning-based prediction model receiving as input features extracted from prefix traces of an event log associated with execution of the running process and generating the predictions, wherein the one or more trained machine learning-based prediction models are trained in an off-line mode using a respective training set including closed cases;
generating explanation-oriented data elements corresponding to the generated predictions, the explanation-oriented data elements including confidence indicators associated with the generated predictions; and
presenting the explanation-oriented data elements in one or more dashboards of a visualization platform.

2. The computer-implemented method of claim 1, wherein the one or more process parameters include a remaining process time parameter indicative of remaining time for the running process.

3. The computer-implemented method of claim 1, wherein the explanation-oriented data elements are representative of an explanation framework for the generated predictions, and wherein the explanation framework is model-agnostic relative to the one or more machine learning-based prediction models.

4. The computer-implemented method of claim 1, wherein the one or more trained machine learning-based prediction models are trained by:
extracting prefix traces from an event log of a closed case;
associating the extracted prefix traces to one or more buckets based on a last known activity in each of the extracted prefix traces; and
encoding the extracted prefix traces in feature vectors associated with each of the one or more buckets to generate a respective trained model for each of the one or more buckets.

5. The computer-implemented method of claim 1, wherein generating the explanation-oriented data elements comprises:

generating a feature contribution data element that is indicative of how a feature contributed to a predicted value associated with the one or more process parameters.

6. The computer-implemented method of claim 5, wherein generating the explanation-oriented data elements further comprises:
identifying and applying comparative attributes from similar cases in a neighborhood.

7. The computer-implemented method of claim 6, wherein generating the explanation-oriented data elements further comprises:
comparing a predicted process parameter of the running process with the similar cases in the neighborhood to derive a confidence indicator for the predicted process parameter in the running process.

8. The computer-implemented method of claim 6, wherein the one or more dashboards include dashboards selected from the group consisting of an overview dashboard, a contributions dashboard and a training data dashboard.

9. The computer-implemented method of claim 8, wherein the overview dashboard is configured to provide a view of remaining time predictions in a selected open case, including one or more parameters selected from the group consisting of current activity, predicted end time, due date, elapsed time, predicted remaining time with prediction interval, and trustworthiness of prediction.

10. The computer-implemented method of claim 8, wherein the contributions dashboard is configured to provide a view of feature contributions of a selected open case.

11. The computer-implemented method of claim 8, wherein the training data dashboard is configured to provide one or more views to facilitate inspection of training data, selection of a particular neighborhood, and predictions from cases in the particular neighborhood.

12. A system comprising:
a memory storing computer instructions; and
at least one processor configured to execute the computer instructions, the computer instructions configured to cause the at least one processor to perform operations of:
generating predictions, using a particular machine learning-based prediction model, for one or more process parameters associated with a running process by selecting the particular machine learning-based prediction model from among one or more trained machine learning-based prediction models for generating the predictions in an on-line mode for the running process, the particular machine learning-based prediction model receiving as input features extracted from prefix traces of an event log associated with execution of the running process and generating the predictions, wherein the one or more trained machine learning-based prediction models are trained in an off-line mode using a respective training set including closed cases;
generating explanation-oriented data elements corresponding to the generated predictions, the explanation-oriented data elements including confidence indicators associated with the generated predictions; and
presenting the explanation-oriented data elements in one or more dashboards of a visualization platform.

13. The system of claim 12, wherein the one or more process parameters include a remaining process time parameter indicative of remaining time for the running process.

14. The system of claim 13, wherein the explanation-oriented data elements are representative of an explanation framework for the generated predictions, and wherein the explanation framework is model-agnostic relative to the one or more machine learning-based prediction models.

15. The system of claim 12, wherein the one or more trained machine learning-based prediction models are trained by:
extracting prefix traces from an event log of a closed case;
associating the extracted prefix traces to one or more buckets based on a last known activity in each of the extracted prefix traces; and
encoding the extracted prefix traces in feature vectors associated with each of the one or more buckets to generate a respective trained model for each of the one or more buckets.

16. The system of claim 12, wherein generating the explanation-oriented data elements comprises:
generating a feature contribution data element that is indicative of how a feature contributed to a predicted value associated with the remaining process time parameter.

17. The system of claim 16, wherein generating the explanation-oriented data elements further comprises:
identifying and applying comparative attributes from similar cases in a neighborhood.

18. The system of claim 17, wherein the one or more dashboards include dashboards selected from the group consisting of an overview dashboard, a contributions dashboard and a training data dashboard.

19. A non-transitory computer-readable medium storing computer program instructions, the computer program instructions, when executed on at least one processor, cause the at least one processor to perform operations comprising:
generating predictions, using a particular machine learning-based prediction model, for one or more process parameters associated with a running process by selecting the particular machine learning-based prediction model from among one or more trained machine learning-based prediction models for generating the predictions in an on-line mode for the running process, the particular machine learning-based prediction model receiving as input features extracted from prefix traces of an event log associated with execution of the running process and generating the predictions, wherein the one or more trained machine learning-based prediction models are trained in an off-line mode using a respective training set including closed cases;
generating explanation-oriented data elements corresponding to the generated predictions, the explanation-oriented data elements including confidence indicators associated with the generated predictions; and
presenting the explanation-oriented data elements in one or more dashboards of a visualization platform.

20. The non-transitory computer-readable medium of claim 19, wherein the explanation-oriented data elements are representative of an explanation framework for the generated predictions, and wherein the explanation framework is model-agnostic relative to the one or more machine learning-based prediction models.

21. The non-transitory computer-readable medium of claim 19, wherein the one or more trained machine learning-based prediction models are trained by:
generating a feature contribution data element that is indicative of how a feature contributed to a predicted value associated with the one or more process parameters; and
identifying and applying comparative attributes from similar cases in a neighborhood.

22. The non-transitory computer-readable medium of claim 19, wherein the one or more dashboards include dashboards selected from the group consisting of an overview dashboard, a contributions dashboard and a training data dashboard.

* * * * *